US007277242B1

(12) United States Patent
Wang et al.

(10) Patent No.: US 7,277,242 B1
(45) Date of Patent: Oct. 2, 2007

(54) LENS MODULE

(75) Inventors: Ching-Shun Wang, Taipei Hsien (TW); Chun-Hua Hsia, Taipei Hsien (TW); Yu-Heng Liu, Taipei Hsien (TW); Yang-Kai Wang, Taipei Hsien (TW); Kuang-Yau Teng, Taipei Hsien (TW); Miy-Chung Wang, Taipei Hsien (TW)

(73) Assignee: Advanced Connection Technology Inc. (TW)

( * ) Notice: Subject to any disclaimer, the term of this patent is extended or adjusted under 35 U.S.C. 154(b) by 0 days.

(21) Appl. No.: 11/723,180

(22) Filed: Mar. 16, 2007

(51) Int. Cl.
*G02B 7/02* (2006.01)
*G02B 27/00* (2006.01)

(52) U.S. Cl. ....................... 359/808; 359/809; 359/819

(58) Field of Classification Search ................. 359/809
See application file for complete search history.

(56) References Cited

U.S. PATENT DOCUMENTS 7,095,572 B2 * 8/2006 Lee et al. ................... 359/808
2002/0154239 A1 * 10/2002 Fujimoto et al. ........... 348/340
2006/0103953 A1 * 5/2006 Lee et al. ................... 359/819

* cited by examiner

*Primary Examiner*—Jordan Schwartz
*Assistant Examiner*—James C Jones
(74) *Attorney, Agent, or Firm*—Berenato, White & Stavish

(57) ABSTRACT

A lens module includes a lens seat, an image sensor unit, a lens set, a circuit board, and a resilient interposer. The lens seat includes a top wall that is formed with a barrel hole, a side wall that extends from a periphery of the top wall and that cooperates with the top wall to define a chamber, and a lens barrel. The lens barrel has a first barrel portion disposed in the chamber and a second barrel portion extending from the first barrel portion and passing through the barrel hole in the top wall. The image sensor unit and the lens set are disposed in the first and second barrel portions of the lens barrel, respectively. The circuit board is disposed to cover an open side of the lens seat, and is connected electrically to the image sensor unit via the resilient interposer.

5 Claims, 2 Drawing Sheets

LENS MODULE

BACKGROUND OF THE INVENTION

1. Field of the Invention

The invention relates to a lens module, more particularly to a lens module with a fixed focal distance.

2. Description of the Related Art

As shown in FIG. 1, a conventional lens module 1 comprises a circuit board 11, a hollow lens seat 12 disposed on the circuit board 11, a lens unit 13 disposed on the lens seat 12, and an image sensor unit 14 disposed in the lens seat 12. The image sensor unit 14 is disposed on the circuit board 11 and is electrically connected to the circuit board 11 through a plurality of conducting wires 141. The lens unit 13 is disposed above the image sensor unit 14 and includes a lens barrel 131, a lens set 132, and an infrared ray filter 133. The lens set 132 gathers incoming light such that the image sensor unit 14 is able to capture an image. The infrared ray filter 133 is disposed between the lens set 132 and the image sensor unit 14, and filters out infrared rays in the incoming light that is reflected by the object to be photographed, thereby improving the image quality.

The construction of the conventional lens module 1 is based on a fixed focal distance, i.e., the distance between the lens set 132 and the image sensor unit 14 is fixed. Moreover, the lens unit 13 is secured to the lens seat 12. The aforementioned design of the conventional lens module 1 results in a relatively simple structure and a relatively small size. The conventional lens module 1 is thus currently adopted by most commercially available camera phones.

In the conventional lens module 1, the image sensor unit 14 is fixed on the circuit board 11 through a solder. The uneven spread or the thermal expansion and contraction of the solder can cause the image sensor unit 14 to deviate from a flat state relative to the circuit board 11, and can result in tilting of the image sensor unit 14 relative to the lens unit 13. Therefore, the object to be photographed can not be imaged clearly on the image sensor unit 14 without distortion, and the image quality is adversely affected. In addition, the lens seat 12 supports the lens unit 13 on the circuit board 11, and keeps the distance between the lens unit 13 and the image sensor unit 14 fixed. However, since the height of the lens seat 12 may not be precisely controlled, the position of the lens unit 13 on the lens seat 12 has to be adjusted during production, thereby resulting in a relatively high cost of manufacturing and in a relatively long production cycle.

SUMMARY OF THE INVENTION

Therefore, the object of the present invention is to provide a lens module that can be manufactured at a lower cost while ensuring a clear imaging quality.

Accordingly, a lens module of the present invention comprises a lens seat, an image sensor unit, a lens set, a circuit board, and a resilient interposer. The lens seat includes a top wall that is formed with a barrel hole, a side wall that extends from a periphery of the top wall, and a lens barrel. The side wall cooperates with the top wall to define a chamber, and has a bottom end that is opposite to the top wall and that defines an open side of the lens seat. The lens barrel has a first barrel portion disposed in the chamber and a second barrel portion extending from the first barrel portion, passing through the barrel hole in the top wall, and disposed outwardly of the chamber. The image sensor unit is disposed in the first barrel portion. The lens set is disposed in the second barrel portion. The circuit board is disposed to cover the open side of the lens seat. The resilient interposer is disposed between and interconnects electrically the image sensor unit and the circuit board.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
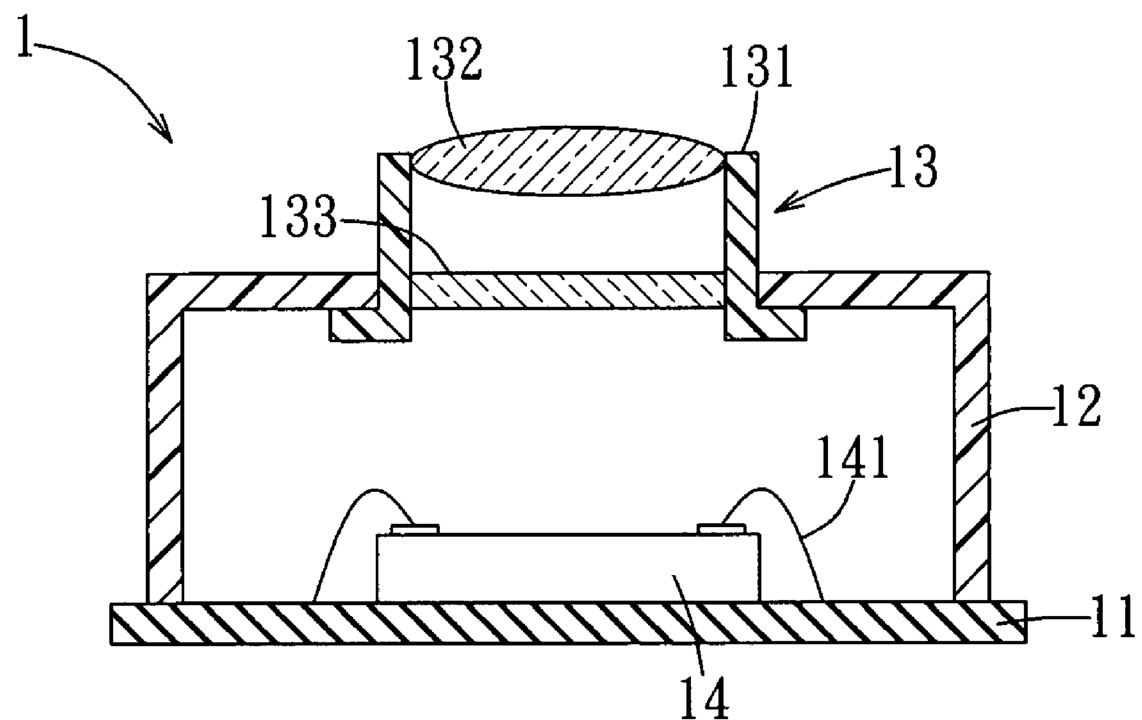
FIG. 1 is an assembled sectional view of a conventional lens module.
Figure 2:
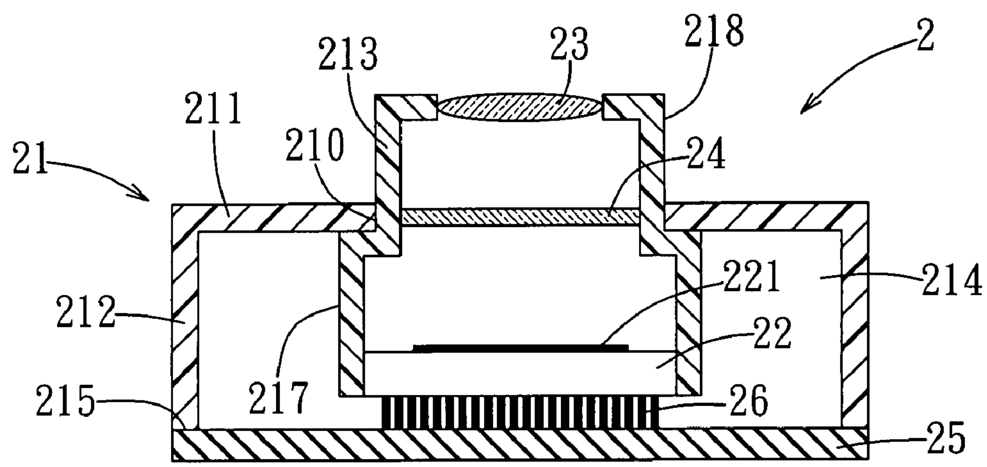
FIG. 2 is an assembled sectional view of a preferred embodiment of a lens module according to this invention.

As shown in FIG. 2, the preferred embodiment of a lens module 2 according to the present invention comprises a lens seat 21, an image sensor unit 22 formed with an image sensing area 221, a lens set 23, an infrared ray filter 24, a circuit board 25, and a resilient interposer 26.

The lens seat 21 includes a top wall 211 that is formed with a barrel hole 210, a side wall 212 that extends from a periphery of the top wall 211, and a lens barrel 213. The side wall 212 cooperates with the top wall 211 to define a chamber 214, and has a bottom end 215 opposite to the top wall 211 and defining an open side of the lens seat 21. The lens barrel 213 has a first barrel portion 217 disposed in the chamber 214 and a second barrel portion 218 extending from the first barrel portion 217, passing through the barrel hole 210 in the top wall 211, and disposed outwardly of the chamber 214.

The image sensor unit 22 and the lens set 23 are disposed in the first and second barrel portions 217, 218 of the lens barrel 213, respectively. Light that comes into the lens barrel 213 via the lens set 23 will be focused on the image sensor unit 22, and the image sensing area 221 of the image sensor unit 22 will capture a clear image. The distance between the image sensor unit 22 and the lens set 23, i.e., the length of the lens barrel 213, is designed to be as long as the focal distance to achieve the clearest image. The infrared ray filter 24 is disposed in the lens barrel 213 between and parallel to the lens set 23 and the image sensor unit 22, and filters out infrared rays in the incoming light that is reflected by the object to be photographed, thereby improving the image quality.

Figure 3:
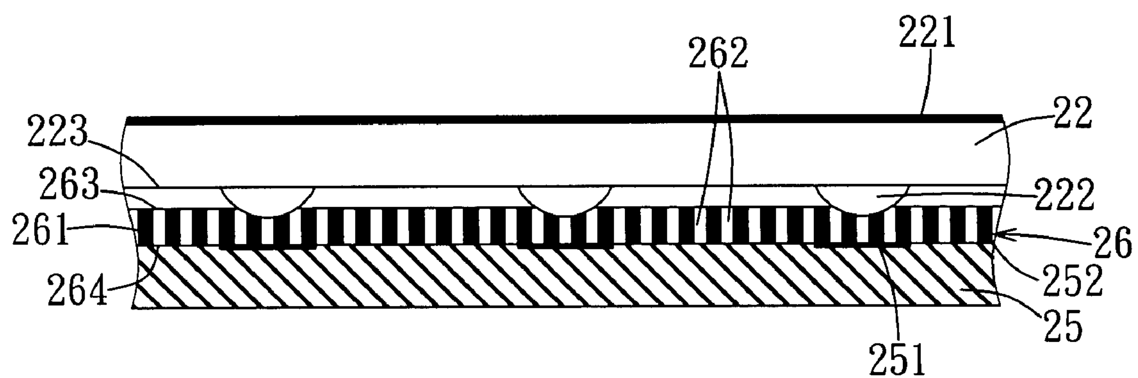
FIG. 3 is an enlarged fragmentary sectional view of the preferred embodiment, illustrating a resilient interposer disposed between an image sensor unit and a circuit board.

As shown in FIGS. 2 and 3, the resilient interposer 26 is composed of a rubber layer 261 and a plurality of thin conductors 262, and has a first contact surface 263 in contact with the image sensor unit 22 and a second contact surface 264 in contact with the circuit board 25 (See FIG. 3). The conductors 262 are spaced apart from each other, and are perpendicular to the image sensor unit 22 and the circuit board 25.

The image sensor unit 22 has a bottom side 223 formed with a conductive contact unit 222. In this embodiment, the conductive contact unit 222 consists of a plurality of tin balls. The circuit board 25 has a top side 252 formed with a plurality of circuit contacts 251 that correspond to the conductive contact unit 222. In this embodiment, the total of the distance between the top wall 211 and the conductive contact unit 222 of the image sensor unit 22, and the thickness of the resilient interposer 26 is designed to be larger than the length of the side wall 212 in a direction away from the top wall 211. Therefore, when the circuit board 25 covers the open side defined by the bottom end 215 of the side wall 212, the resilient interposer 26 will be pressed by the conductive contact unit 222 of the image sensor unit 22 at the first contact surface 263, and by the circuit contacts 251 of the circuit board 25 at the second contact surface 264. Accordingly, the resilient interposer 26 will interconnect electrically the image sensor unit 22 and the circuit board 25. Since the resilient interposer 26 is both resilient conductive, electrical connection between the image sensor unit 22 and the circuit board 25 can be ensured to achieve stable transmission of captured signals, regardless of whether the resilient interposer 26 is evenly pressed at the first and second contact surfaces 263, 264.

The image sensor unit 22 is a CMOS image sensor in this embodiment, but may be a CCD image sensor in other embodiments of this invention. In addition, at least one of the first and second contact surfaces 263, 264 of the resilient interposer 26 may be designed to be a wavy surface for enlarging the contact area, so that the resilient interposer 26 will more stably interconnect electrically the image sensor unit 22 and the circuit board 25.

Compared to the prior art, the image sensor unit 22 and the lens unit 23 are both disposed in the lens barrel 213, and the image sensor unit 22 is connected to the circuit board 25 via the resilient interposer 26. As a result, even if the length of the side wall 212 is not precisely controlled, there is no need to adjust the lens set 23, thereby resulting in a lower manufacturing cost and a shorter production cycle while ensuring a clear imaging quality.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lens module comprising:

a lens seat including

- a top wall that is formed with a barrel hole,
- a side wall that extends from a periphery of said top wall, that cooperates with said top wall to define a chamber, and that has a bottom end opposite to said top wall and defining an open side of said lens seat, and
- a lens barrel that has a first barrel portion disposed in said chamber and a second barrel portion extending from said first barrel portion, passing through said barrel hole in said top wall, and disposed outwardly of said chamber;

an image sensor unit disposed in said first barrel portion;

a lens set disposed in said second barrel portion;

a circuit board disposed to cover said open side of said lens seat; and a resilient interposer disposed between and interconnecting electrically said image sensor unit and said circuit board.

2. The lens module as claimed in claim 1, wherein said resilient interposer has a first contact surface in contact with said image sensor unit and a second contact surface in contact with said circuit board, at least one of said first and second contact surfaces being a wavy surface.

3. The lens module as claimed in claim 1, further comprising an infrared ray filter disposed in said lens barrel between said lens set and said image sensor unit.

4. The lens module as claimed in claim 1, wherein said image sensor unit is a CMOS image sensor and has one side formed with a conductive contact unit to connect electrically with said resilient interposer.

5. The lens module as claimed in claim 1, wherein said image sensor unit is a CCD image sensor and has one side formed with a conductive contact unit to connect electrically with said resilient interposer.

* * * * *